United States Patent [19]
Jones

[11] Patent Number: 6,050,040
[45] Date of Patent: Apr. 18, 2000

[54] DECORATIVE ANTI SLIP FLOOR COVERING

[76] Inventor: Craig S. Jones, 47421 Brent Ct., Chesterfield, Mich. 48047

[21] Appl. No.: 09/146,572

[22] Filed: Sep. 3, 1998

Related U.S. Application Data

[60] Provisional application No. 60/058,082, Sep. 5, 1997.
[51] Int. Cl.$^7$ ........................................ E04F 13/00
[52] U.S. Cl. ........................ 52/390; 52/403.1; 52/311.1; 52/314
[58] Field of Search .................. 52/390, 403.1, 52/311.1, 314, 782.1, 787.1, 787.11, 787.12; 428/67, 138

[56] References Cited

U.S. PATENT DOCUMENTS

| | | |
|---|---|---|
| 2,049,778 | 8/1936 | Mowery ........................ 52/390 |
| 3,740,914 | 6/1973 | Arnaiz Diez .................. 52/515 |
| 3,977,146 | 8/1976 | Wiley ............................ 52/787.1 |
| 4,682,459 | 7/1987 | Stephenson ................... 52/390 |
| 5,016,413 | 5/1991 | Counihan ...................... 52/390 |
| 5,747,133 | 5/1998 | Vinod et al. .................. 52/390 |
| 5,819,488 | 10/1998 | Jones ............................ 52/390 |
| 5,830,549 | 11/1998 | Sweet et al. ................. 52/390 |
| 5,845,459 | 12/1998 | Nathan ........................ 52/787.11 |

*Primary Examiner*—Carl D. Friedman
*Assistant Examiner*—Dennis L. Dorsey
*Attorney, Agent, or Firm*—Lyon, P.C.

[57] ABSTRACT

A tile for superposition over a horizontal floor comprises a thin flat metal plate of uniform thickness with a plurality of apertures extending laterally therethrough in spaced relation to one another and to the edges of thereof and having a non-metallic insert in each of the apertures of a thickness less than the thickness of the metal portion of the tile and having an upper surface disposed below the upper surface of the metal portion of the tile.

4 Claims, 1 Drawing Sheet

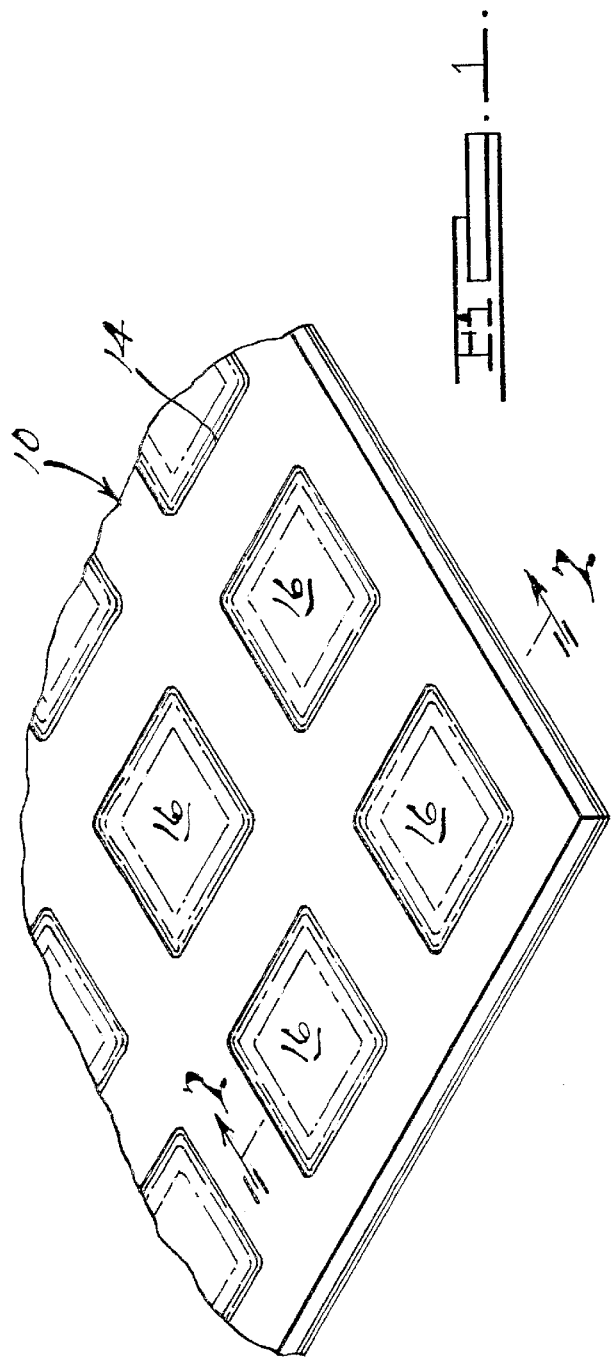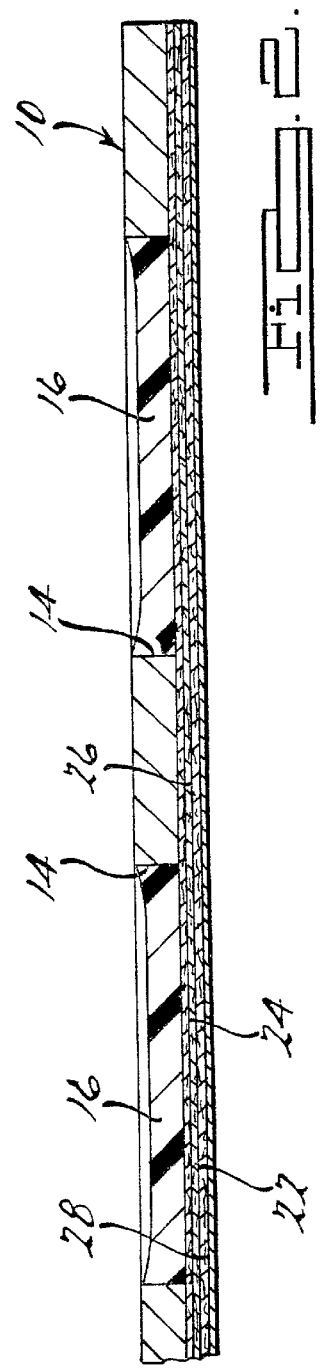

DECORATIVE ANTI SLIP FLOOR COVERING

This application is a continuation of a Provisional Application No. 60/058,082 filed Sep. 5, 1997.

BACKGROUND OF THE INVENTION

Commercial facilities are typically constructed with a base floor comprising a concrete slab. Due to the relatively unattractive and slick surface of bare concrete floors, a coating having a granular additive and a colored pigment is often applied directly thereto to provide an anti slip surface and to enhance the aesthetic appeal of the floor. Such commercial floor coverings typically comprise paint or epoxy-type coatings.

However, such known floor coatings do not exhibit optimum anti slip characteristics. Moreover, their durability is limited, typically lasting on the order of 2–5 years before requiring labor intensive resurfacing.

SUMMARY OF THE INVENTION

The broad object of the present invention is an improved floor covering that is aesthetically pleasing yet exhibits significantly higher resistance to slip than conventional commercial floor finishes or coverings.

Another object of the present invention is a relatively permanent floor covering that is easy to install and requires little maintenance.

Another object of the present invention is a relatively permanent anti slip floor covering the coloring of which is protected against deterioration.

More particularly, the finish floor covering of the present invention comprises a plurality of tiles adapted to be positioned on a base floor surface in abutting relation. The tiles are preferably made from aluminum sheet material. Each tile has a plurality of apertures therein that are filled with a depressed colored material, preferably epoxy.

The present invention will be more fully understood from the following detailed description of the preferred embodiment in conjunction with the accompanying drawing.

BRIEF DESCRIPTION OF THE DRAWINGS

FIG. 1. is a perspective view of a floor tile in accordance with the present invention;

FIG. 2. is a cross section taken along the line 2—2 of FIG. 1.

DETAILED DESCRIPTION OF THE PREFERRED EMBODIMENT(S)

As illustrated in FIGS. 1 and 2, a floor tile 10, in accordance with a preferred constructed embodiment of the present invention, is formed from aluminum sheet that is, for example, 0.0625 inches (0.158 cm) thick. The tile 10 has a plurality of apertures 14 extending entirely therethrough in a waffle-like pattern. In the constructed embodiment the tiles have a dimension of 16_in.×16_in. (≈43 cm×43 cm), and the apertures 14 are 0.750 inches (1.905 cm) square. However, one of ordinary skill in the art will readily appreciate that the actual size and shape of the tile 10 and/or the apertures 14 therein can be varied as desired.

Referring now to FIG. 2, each aperture 14 in the tile 10 is filled with epoxy 16, the top surface of which is downwardly concave from the upper surface of the tile 10. Thus, the colored epoxy 16 is protected so to maintain its appearance while the surrounding surface of the tile 10 exhibits anti slip and wear resistant properties.

A foam layer 22 is bonded to the lower surface of each tile 10 by an adhesive layer 24 that is disposed on the top surface of the foam. A second adhesive layer 26 is provided on a lower surface of the foam 22. The adhesive layer 26 is protected by a removable film 28.

Installation of a finished tile 10 is readily accomplished by merely stripping the film 28 from the adhesive 26 on the lower surface of the foam 22 and placing the tile 10 on a floor surface in a desired array.

It will be understood that the foregoing description of the preferred embodiment of the present invention is for illustrative purposes only, and that the various structural and operational features herein disclosed are susceptible of a number of modifications, none of which departs form the spirit and scope of the present invention.

I claim:

1. A tile for superposition over a horizontal floor, said tile comprising:
   a thin flat metal plate of uniform thickness having a plurality of apertures extending laterally and entirely therethrough in spaced relation to one another and to the edges of said plate, and
   a non-metallic insert in each of the apertures in the metal portion of said tile, the thickness of said non-metallic inserts being less than the thickness of the surrounding metal portion of said tile and having an upper surface disposed below the upper surface of the metal portion of said tile whereby the metal portion of said tile affords skid and wear resistance for said floor.

2. The tile of claim 1 wherein said non-metallic insert comprises an epoxy resin.

3. The tile of claim 1 including a foam layer adhesively bonded to a lower surface of both the metal and non-metallic inserts of said tile, said foam having an adhesive on a lower surface thereof for bonding to said floor.

4. A tile for superposition over a horizontal floor, said tile comprising:
   a thin flat metal plate of uniform thickness having a plurality of apertures extending laterally therethrough in spaced relation to one another and to the edges of said plate,
   a non-metallic insert in each of the apertures in the metal portion of said tile; and
   a layer of foam adhesively bonded to a lower surface of both the metal portions of said plate and non-metallic-inserts in said plate, said foam having an adhesive on a lower surface thereof for bonding to said floor.

* * * * *